United States Patent
Decoster et al.

(10) Patent No.: US 10,960,714 B2
(45) Date of Patent: Mar. 30, 2021

(54) TIRE WITH PRINTED SHEAR SENSORS

(71) Applicant: The Goodyear Tire & Rubber Company, Akron, OH (US)

(72) Inventors: Yves Francois Claude Decoster, Ethe (BE); Andrei Dan Anton, Jud. Cluj (RO)

(73) Assignee: The Goodyear Tire & Rubber Company, Akron, OH (US)

( * ) Notice: Subject to any disclaimer, the term of this patent is extended or adjusted under 35 U.S.C. 154(b) by 293 days.

(21) Appl. No.: 16/142,042

(22) Filed: Sep. 26, 2018

(65) Prior Publication Data

US 2020/0094634 A1 Mar. 26, 2020

(51) Int. Cl.
*B60C 23/06* (2006.01)
*B60C 23/00* (2006.01)
(Continued)

(52) U.S. Cl.
CPC ............ *B60C 23/064* (2013.01); *B33Y 80/00* (2014.12); *B60C 23/003* (2013.01); *G01L 9/04* (2013.01); *G01L 17/00* (2013.01); *G01L 17/005* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06;
(Continued)

(56) References Cited

U.S. PATENT DOCUMENTS 7,493,807 B2   2/2009   Demale et al. .......... B60C 23/02
8,661,885 B1 *  3/2014   Singh ...................... B60C 23/064
                                                              73/146

(Continued)

FOREIGN PATENT DOCUMENTS

EP   1757464 A1   2/2007
JP   2006064565 A  3/2006

OTHER PUBLICATIONS

Andrews Joseph B et al, Fully printed and flexible carbon nanotube transistors designed for environmental pressure sensing and aimed at smart tire applications, Duke University, Department or Electrical and Computer Engineering:, Oct. 29, 2017 (Oct. 29, 2017), pp. 1-3, 2017 IEEE Sensors, Durham, NC, US.

(Continued)

*Primary Examiner* — Andre J Allen
(74) *Attorney, Agent, or Firm* — Edward T. Kennedy

(57) ABSTRACT

A tire with printed shear sensors includes a pair of bead areas and a ground-contacting tread disposed radially outwardly of the pair of bead areas. A pair of sidewalls includes an inboard sidewall extending from a first one of the bead areas to the tread and an outboard sidewall extending from a second one of the bead areas to the tread. A carcass extends toroidally between each of the bead areas radially inwardly of the tread, and an innerliner is formed on an inside surface of the carcass. A pair of resistive shear sensors is printed on the innerliner, including a first shear sensor printed in a sidewall zone of the inboard sidewall and a second shear sensor printed in a sidewall zone of the outboard sidewall.

18 Claims, 11 Drawing Sheets

(51) Int. Cl.
*G01L 17/00* (2006.01)
*B33Y 80/00* (2015.01)
*G01L 9/04* (2006.01)

(58) Field of Classification Search
CPC ........ G01M 17/08; G01M 1/02; G01M 1/045;
G01M 1/12; G01M 1/225; G01M 3/04;
G01M 3/40; G01M 5/0091; G01M 7/02;
G01M 99/00; G01M 99/002; B60C
23/0494; B60C 2019/004; B60C 23/0493;
B60C 23/064; B60C 19/00; B60C 23/04;
B60C 23/0488; B60C 23/0498; B60C
23/0496; B60C 23/0408; B60C 23/041;
B60C 23/0411; B60C 23/06; B60C 23/20;
B60C 11/246; B60C 23/0486; B60C
23/061; B60C 11/243; B60C 99/00; B60C
11/0083; B60C 13/003; B60C 2009/2038;
B60C 23/004; B60C 23/02; B60C
23/0401; B60C 23/0406; B60C 23/0416;
B60C 23/0433; B60C 23/0455; B60C
23/0459; B60C 23/0474; B60C 23/0489;
B60C 23/0491; B60C 25/002; B60C
25/005; B60C 25/007; B60C 29/02; B60C
3/04; B60C 99/006; B60C 11/0332; B60C
11/24; B60C 13/001; B60C 13/02; B60C
15/0036; B60C 17/02; B60C 2009/0071;
B60C 2009/2022; B60C 2200/02; B60C
2200/06; B60C 2200/065; B60C 23/00;
B60C 23/001; B60C 23/003; B60C
23/007; B60C 23/008; B60C 23/0413;
B60C 23/0427; B60C 23/0447; B60C
23/0454; B60C 23/0457; B60C 23/0462;
B60C 23/0471; B60C 23/0472; B60C
23/0476; B60C 23/0479; B60C 23/0484;
B60C 23/065; B60C 23/066; B60C 23/10;
B60C 25/0548; B60C 25/056; B60C
25/132; B60C 25/138; B60C 29/005;
B60C 9/005; B60C 9/18; B60C 9/1807;
B60C 9/20; B60C 9/28; G01L 17/00;
G01L 17/005; G01L 19/0645; G01L
19/147; G01L 1/16; G01L 1/18; G01L
7/187; G01L 9/0052; G01L 9/008

USPC .................................................. 73/146–146.8
See application file for complete search history.

(56) References Cited

U.S. PATENT DOCUMENTS

| | | | | |
|---|---|---|---|---|
| 2007/0251619 | A1* | 11/2007 | Bertrand | B60C 23/064 |
| | | | | 152/152.1 |
| 2007/0256485 | A1* | 11/2007 | Rensel | B60C 23/0493 |
| | | | | 73/146 |
| 2007/0272006 | A1* | 11/2007 | Demaie | B60C 19/00 |
| | | | | 73/146 |
| 2008/0127753 | A1 | 6/2008 | Miyoshi | |
| 2008/0190187 | A1 | 8/2008 | Bertrand | |
| 2008/0289407 | A1* | 11/2008 | Gramling | G01P 15/09 |
| | | | | 73/146.5 |
| 2008/0302177 | A1 | 12/2008 | Sinnett | |
| 2015/0217607 | A1* | 8/2015 | Singh | B60C 23/0493 |
| | | | | 152/510 |
| 2015/0266717 | A1* | 9/2015 | Okamoto | B81B 3/0091 |
| | | | | 257/418 |
| 2015/0331533 | A1* | 11/2015 | McMillen | A61B 5/6843 |
| | | | | 345/174 |
| 2016/0290880 | A1* | 10/2016 | Lewis | G06F 3/014 |
| 2016/0314881 | A1 | 10/2016 | Ng | |
| 2016/0318356 | A1* | 11/2016 | McMillen | G01B 7/06 |
| 2017/0234745 | A1* | 8/2017 | Choi | G01L 17/00 |
| | | | | 73/146.3 |
| 2019/0234816 | A1* | 8/2019 | LaBelle | H01B 1/24 |

OTHER PUBLICATIONS

Anonymous, Printed Sensor Monitors Tire Tread in Real Time, Cars That Think, Feb. 26, 2018 (Feb. 26, 2018), IEEE Spectrum.
Hariri H et al, Performance validation of printed strain sensors for active control of intelligent tires, Applied Acoustics, Mar. 18, 2017 (Mar. 18, 2017), pp. 73-84, figures 10a-10d,11,13, vol. 123, Elsevier Publishing, GB.
EPO search report dated Nov. 27, 2019.
Abstract from IEEE Xplore Digital Library, "Flexible Packaging for Tyre Integrated Shear Force Sensor", S. Kulinyi, et al., published at conference in Taipei, Taiwan, Oct. 28-31, 2012.

* cited by examiner

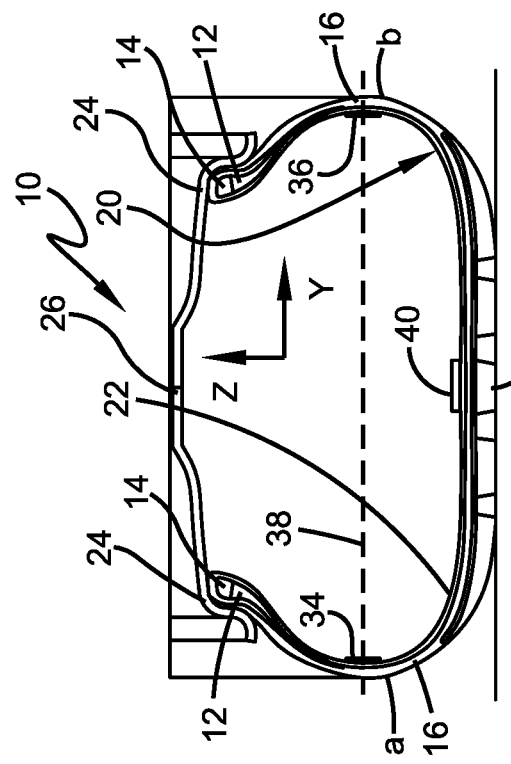
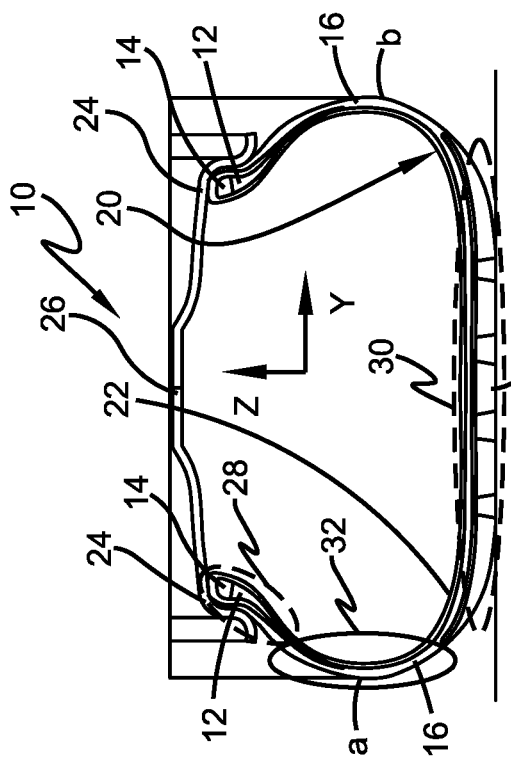

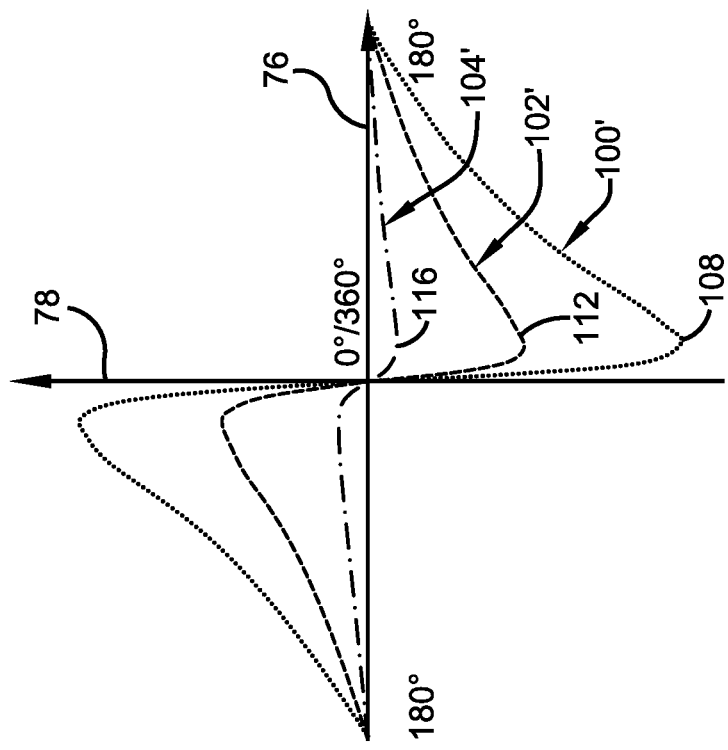
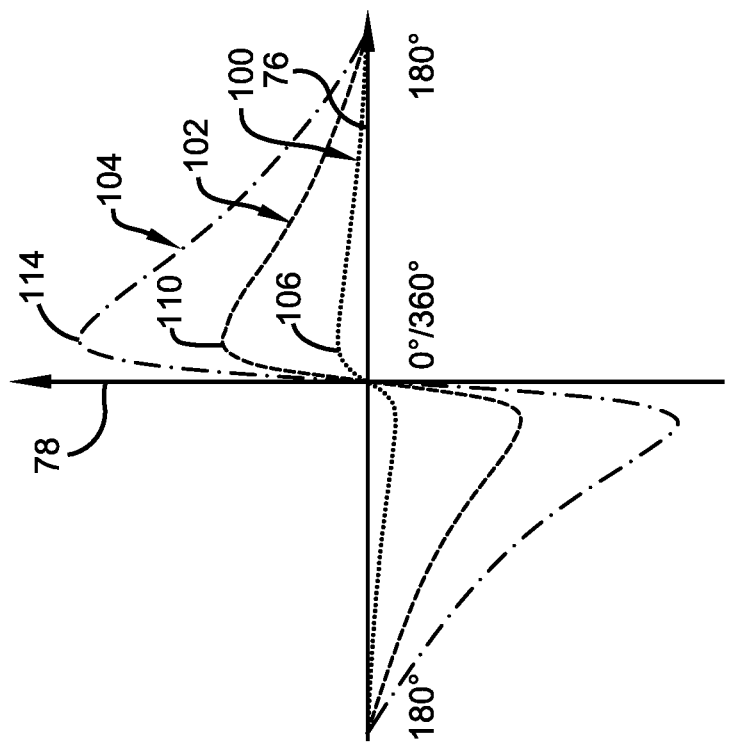
Figure 8a
Figure 8b

TIRE WITH PRINTED SHEAR SENSORS

FIELD OF THE INVENTION

The invention relates to tires. More particularly, the invention relates to tires with electronic sensors that sense various conditions within a tire. Specifically, the invention is directed to a tire that includes shear sensors which are printed on the innerliner of the tire that enable accurate determination of load conditions on the tire and the wear state of the tire.

BACKGROUND OF THE INVENTION

In the manufacture of a pneumatic tire, the tire is typically built on the drum of a tire-building machine, which is known in the art as a tire building drum. Numerous tire components are wrapped about and/or applied to the drum in sequence, forming a cylindrical-shaped tire carcass. The tire carcass is then expanded into a toroidal shape for receipt of the remaining components of the tire, such as a belt package and a rubber tread. The completed toroidally-shaped unvulcanized tire carcass, which is known in the art at that stage as a green tire, is then inserted into a mold or press for forming of the tread pattern and curing or vulcanization.

For many modern tires, it is often desirable to mount electronic components to the tires either before or after curing. Such electronic components enable certain tire parameters to be monitored. For example, in the prior art, discrete electronic sensor units have been attached to the inside surface of the pneumatic tire, which is known as the tire innerliner, using an adhesive. Such sensors measure deformation of the sidewall of the tire to provide data which can be used to determine the load on the tire. Such data can be communicated to vehicle stability and/or braking systems to provide improved control of the vehicle, and can be used for monitoring or tracking driving behavior.

While prior art discrete electronic sensor units are acceptable for their intended purpose, it is desirable to improve the accuracy of measurements of tire sidewall deformation to determine different load conditions on the tire, and the wear state of the tire, in a more precise and repeatable manner. By way of background, typical prior art deformation sensor units include a long, thin strip of conductive material arranged to form a zig-zag pattern of parallel lines, which is attached to a substrate material. An excitation voltage is applied to terminal ends of the strip and electrical resistance is then measured. The deformation of the tire at the location of the sensor may be calculated from the measured resistance, as known to those skilled in the art. Other deformation sensors known in the art involve measuring electrical capacitance of the conductive material or using optical fibers.

In the prior art, when a discrete electronic sensor unit is attached to the tire innerliner, it is adhered to the innerliner in order to preserve the integrity of the innerliner. However, due to variance in adhesives, the pressure applied to the sensor unit, and/or locating techniques, sensor units may not be uniformly applied to the tire innerliner, which is known as manufacturing dispersion. Such manufacturing dispersion may lead to less-than-optimum indication of sidewall deformation, which in turn may reduce the accuracy of the determination of load conditions on the tire and/or tire wear.

Likewise, as a discrete electronic sensor undergoes repeated deformation cycles, the measurement of resistance may change and become less accurate, which is known as aging effect. Such aging effect may again lead to less-than-optimum indication of sidewall deformation, which in turn may reduce the accuracy of the determination of load conditions on the tire and/or tire wear.

As a result, it is desirable to develop a tire with a sensor configuration that improves the accuracy of measurements of tire sidewall deformation, thereby enabling load conditions on the tire and the wear state of the tire to be determined in a more precise and repeatable manner, and to reduce manufacturing dispersion and aging effect.

SUMMARY OF THE INVENTION

According to an aspect of an exemplary embodiment of the invention, a tire with printed shear sensors is provided. The tire includes a pair of bead areas and a ground-contacting tread disposed radially outwardly of the pair of bead areas. A pair of sidewalls includes an inboard sidewall extending from a first one of the bead areas to the tread and an outboard sidewall extending from a second one of the bead areas to the tread. A carcass extends toroidally between each of the bead areas radially inwardly of the tread, and an innerliner is formed on an inside surface of the carcass. A pair of resistive shear sensors is printed on the innerliner, including a first shear sensor printed in a sidewall zone of the inboard sidewall and a second shear sensor printed in a sidewall zone of the outboard sidewall.

According to another aspect of an exemplary embodiment of the invention, a tire with printed shear sensors is provided. The tire includes a pair of bead areas and a ground-contacting tread disposed radially outwardly of the pair of bead areas. A pair of sidewalls includes an inboard sidewall extending from a first one of the bead areas to the tread and an outboard sidewall extending from a second one of the bead areas to the tread. A carcass extends toroidally between each of the bead areas radially inwardly of the tread, and an innerliner is formed on an inside surface of the carcass. A plurality of resistive shear sensors is printed about the circumference of the tire on the innerliner in a sidewall zone of a selected one of the inboard sidewall and the outboard sidewall.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Circumferential" means lines or directions extending tangentially along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"Radial-ply tire" means a belted or circumferentially-restricted pneumatic tire in which the ply cords which extend from bead to bead are laid at cord angles between about 65 to about 90 degrees with respect to the equatorial plane of the tire.

"TPMS" means a tire pressure monitoring unit, which is an electronic system that measures the internal pressure of a tire and is capable of communicating the pressure to a processor that is mounted on the vehicle and/or is in electronic communication with electronic systems of the vehicle.

BRIEF DESCRIPTION OF DRAWINGS

The invention will be described by way of example and with reference to the accompanying drawings, in which:

FIG. 1 is a schematic cross-sectional view of a portion of an exemplary embodiment of a tire prior to the forming of shear sensors on the innerliner, shown mounted on a wheel;

FIG. 2 is a schematic cross-sectional view of a portion of the tire shown in FIG. 1 with printed shear sensors formed on the innerliner, comprising an exemplary embodiment of a tire with printed shear sensors of the present invention;

FIG. 3b is a schematic representation of an end view of the tire shown in FIG. 3a;

FIG. 4a is a graphical representation of a signal of the shear sensors shown in FIG. 3a;

FIG. 4b is a graphical representation of another signal of the shear sensors shown in FIG. 3a;

FIG. 5b is a schematic cross-sectional view of the tire shown in FIG. 5a;

FIG. 8a is a graphical representation of still another set of signals of the shear sensors shown in FIG. 2;

FIG. 8b is a graphical representation of yet another set of signals of the shear sensors shown in FIG. 2;

FIG. 10b is a graphical representation of a set of signals of the shear sensors shown in FIG. 10a.

Similar numerals refer to similar parts throughout the drawings.

DETAILED DESCRIPTION OF THE INVENTION

Figure 3B:
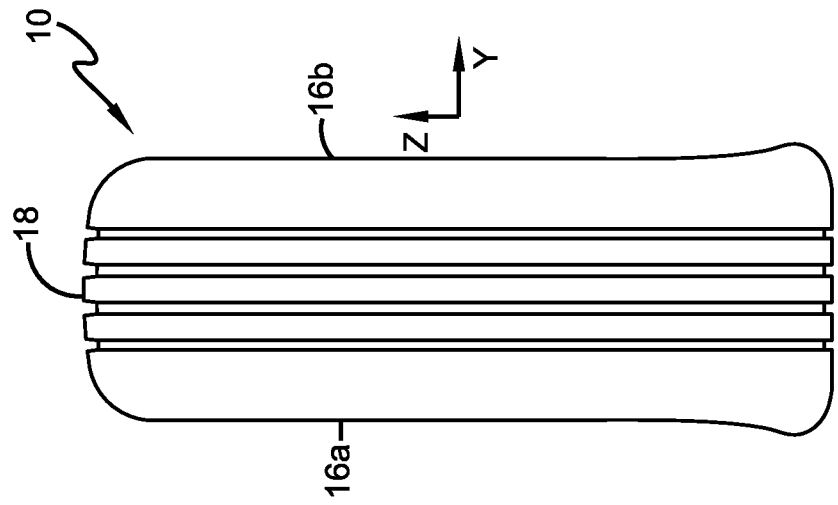

An exemplary embodiment of a tire 10 is shown in FIG. 1. The tire 10 includes a pair of bead areas 12, each one of which is formed with a bead core 14 that is embedded in the respective bead areas. Each one of a pair of sidewalls 16 extends radially outward from a respective bead area 12 to a ground-contacting tread 18. The tire 10 is reinforced by a carcass 20 that toroidally extends from one bead area, such as an inboard bead area 12a, to the other bead area, such as an outboard bead area 12b, also as known to those skilled in the art. The carcass includes multiple layers or plies, as known to those skilled in the art. An innerliner 22 is formed on the inner or inside surface of the carcass 20. The tire 10 is mounted on the flange 24 of a wheel or rim 26, as known in the art.

The tire 10 includes an inboard surface indicated generally by the letter "a" and an outboard surface indicated generally by the letter "b". As a result, components at the tire inboard surface are denoted with an "a" designation and components at the tire outboard surface are denoted with a "b" designation. For example, the sidewall 16 at the inboard surface "a" of the tire 10 is an inboard sidewall 16a, and the sidewall at the outboard surface "b" of the tire is an outboard sidewall 16b.

The tire 10 includes three axes upon which forces act, including a "Y" axis extending in the axial or lateral direction, a "Z" axis extending in the radial or vertical direction, and an "X" axis (FIG. 3a) extending in the longitudinal direction or direction of the travel of the tire. The tire 10 also includes three zones with different levels of rigidity. A first or apex zone 28 is disposed at each respective bead area 12, a second or crown zone 30 is disposed at the tread 18, and a third or sidewall zone 32 is disposed at each respective sidewall 16 between the apex and crown zones. The sidewall zone 32 typically is less rigid and thus deforms more during rotation of the tire 10 than the apex zone 28 and the crown zone 30. As a result, measurement of deformation at the sidewall zone 32 is important.

Shear forces are one of the main mechanical modes of deformation at the sidewall zone 32. The shear forces depend on many factors, including tire parameters such as the size of the tire 10, the configuration or type of construction of the tire, the compounds and reinforcement materials employed in the tire, and the tire inflation pressure. The shear forces at the sidewall zone 32 also depend on the rolling speed of the tire 10 and load forces, including vertical loading or loading along the Z axis, longitudinal loading or loading along the X axis, and lateral loading or loading along the Y axis. Because of the relationship between load forces and the shear forces that cause deformation of the sidewall zone 32, when the tire parameters are known, an accurate measurement of deformation at the sidewall zone enables the vertical load, longitudinal load and lateral load of the tire 10 to be determined. Therefore, an accurate and repeatable measurement of deformation of the sidewall zone 32 is important to accurately determine the forces acting on the tire 10.

Turning to FIG. 2, in order to provide accurate and repeatable measurement of deformation at the sidewall zone 32, the tire 10 includes a first or inboard shear sensor 34. The inboard shear sensor 34 preferably is a resistive shear strain sensor and is printed on the innerliner 22 at the sidewall zone 32 of the inboard sidewall 16*a*. The tire 10 also includes a second or outboard shear sensor 36. The outboard shear sensor 36 preferably also is a resistive shear strain sensor and is printed on the innerliner 22 at the sidewall zone 32 of the outboard sidewall 16*b*. The shear sensors 34 and 36 measure the deformation of the innerliner 22 at the sidewall zone 32 of each respective sidewall 16*a* and 16*b*, enabling the vertical loading, lateral loading, longitudinal loading and wear state of the tire 10 to be determined, as will be explained in greater detail below.

The shear sensors 34 and 36 are disposed in the same horizontal plane 38 extending laterally across the tire 10, and preferably are in electronic communication with a TPMS unit 40. The TPMS unit 40 preferably is attached to the innerliner 22 by an adhesive or other means known to those skilled in the art. The TPMS unit 40 typically includes an internal processor and an antenna or other communication means for communicating data to an external processor and/or to the local electronic device network or Controller Area Network (CAN bus) of the vehicle on which the tire 10 is mounted.

Preferably, the shear sensors 34 and 36 are in wireless communication with the TPMS unit 40. The TPMS unit 40 may thus receive measurements from the shear sensors 34 and 36 and employ its processor to calculate the vertical loading, lateral loading, longitudinal loading and wear state of the tire 10, and transmit the calculated data to the vehicle control systems through the CAN bus. Alternatively, the TPMS unit 40 may transmit measurements from the shear sensors 34 and 36 to an external processor for the calculation of the vertical loading, lateral loading, longitudinal loading and wear state of the tire 10, followed by transmission of the calculated data to the vehicle control systems through the CAN bus.

Each shear sensor 34 and 36 preferably is directly printed on the innerliner 22 at the sidewall zone 32 of each respective inboard sidewall 16*a* and outboard sidewall 16*b* by ink-jet printing or by three-dimensional (3D) printing. The specific configuration and location of each shear sensor 34 and 36 in the sidewall zone 32 depends upon the construction and size of the tire 10. Each shear sensor 34 and 36 is printed using a conductive ink 42 (FIG. 6) with a known electrical resistance, and which is flexible. The printing of the shear sensors 34 and 36 on the innerliner 22 is performed according to inkjet printing or 3D printing techniques that are known to those skilled in the art.

The shear sensors 34 and 36 may be printed directly on the innerliner 22 at the sidewall zone 32 of each respective inboard sidewall 16*a* and outboard sidewall 16*b*. Such direct printing enables the shear sensors 34 and 36 to directly sense deformation of the innerliner 22 without any intervening structure or additional media. Stability of the conductive ink 42 over a range of temperatures enables direct printing of each shear sensor 34 and 36 on the innerliner 22 before curing of the tire 10 or after curing of the tire.

Alternatively, each shear sensor 34 and 36 may be printed on a discrete substrate such as foil, rubber, plastic or a combination thereof. Preferably, the substrate is of a flexible and soft rubber-foil compound that has a short relaxation time, which enables each shear sensor 34 and 36 to sense deformation of the tire 10, as will be described in greater detail below, without any distortion or loss of sensitivity. The combination substrate and shear sensor 34 and 36 may be attached to the innerliner at the sidewall zone 32 of each respective inboard sidewall 16*a* and outboard sidewall 16*b* using an adhesive, ultrasonic welding, or other techniques known to those skilled in the art. Stability of the conductive ink 42 over a range of temperatures enables attachment of the substrate and shear sensor 34 and 36 to the innerliner 22 before curing of the tire 10 or after curing of the tire. Installing a substrate and shear sensor 34 and 36 on an after-cured tire 10 enables each shear sensor to be manufactured independently of the tire and provides independent quality control for the shear sensors separate from the tire. In addition, the use of a substrate and shear sensor 34 and 36 may enable a variety of options in the electrical connection and electronic communication between the shear sensors and the TPMS unit 40.

Figure 6:
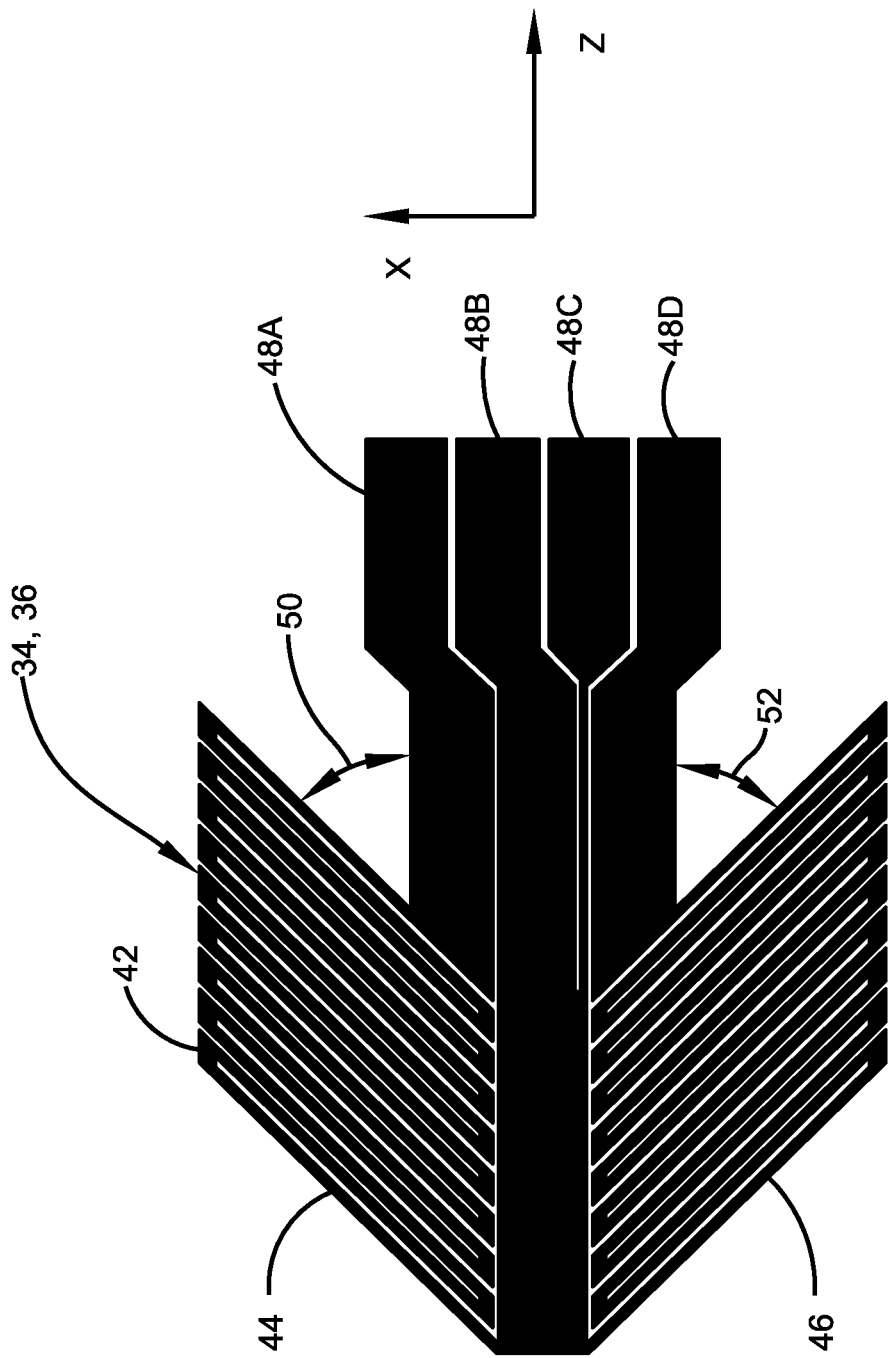
FIG. 6 is a schematic representation of an exemplary embodiment of a printed shear sensor for the tire shown in FIG. 2.

Turning now to FIG. 6, each shear sensor 34 and 36 includes a specific configuration in order to optimize the measurement of deformation and shear strain in the sidewall zone 32 of each respective inboard sidewall 16*a* and outboard sidewall 16*b*. The conductive ink 42 is deposited in a long, thin strip arranged to form a first set of parallel elements 44, a second set of parallel elements 46 and a plurality of terminals 48A through 48D.

The first set of parallel elements 44 is oriented at a first angle 50 relative to the Z axis, while the second set of parallel elements 46 is oriented at a second angle 52 relative to the Z axis that is the opposite or negative of the first angle. Preferably, the first angle 50 is about 45 degrees relative to the Z axis and the second angle 52 is about −45 degrees relative to the Z axis. A first terminal 48A provides a connection to the first set of parallel elements 44 and a fourth terminal 48D provides a connection to the second set of parallel elements 46. A second terminal 48B is disposed parallel to the Z axis between the first set of parallel elements 44 and the second set of parallel elements 46, and a third terminal 48C is disposed parallel to the Z axis between the second terminal and the fourth terminal 48D.

The first set of parallel elements 44 provides a signal in a positive direction along the X axis and Z axis direction, which is referred to as positive shear. The second set of parallel elements 46 provides a signal in a negative direction along the X axis and Z axis direction, which is referred to as negative shear. Because a shear strain sensor provides a greater signal in elongation than in compression, the opposing orientation of the first set of parallel elements 44 and the second set of parallel elements 46 increases the sensitivity of each shear sensor 34 and 36 and enables each shear sensor to provide a significant signal over a greater range of deformation of the tire 10. For example, the first set of parallel elements 44 operates over a shear sensor position from about 0 degrees to about 180 degrees of rotation of the tire 10, and the second set of parallel elements 46 operates over a shear sensor position from about 180 degrees to about 360 degrees of rotation of the tire, as will be described in greater detail below.

Preferably, each shear sensor 34 and 36 delivers at least three signals. A first signal, 48A:48B, is a positive shear strain signal, which is a measurement of shear strain between the first terminal 48A and the second terminal 48B. The positive shear strain signal occurs during the first half of rotation of the tire 10, as will be described in greater detail below. A second signal, 48B:48D, is a negative shear strain signal, which is a measurement of shear strain between the second terminal 48B and the fourth terminal 48D. The negative shear strain signal occurs during the second half of rotation of the tire 10, as will be described in greater detail below. A third signal, 48B:48C, is a reference signal that is a measurement between the second terminal 48B and the third terminal 48C, which are both parallel to the Z axis.

The first signal 48A:48B, the second signal 48B:48D and the third signal 48B:48C are proportional to the resistivity of the ink 42. When the first signal 48A:48B is divided by the third signal 48B:48C, the ratio 48A:48B/48B:48C provides a normalized value of the resistivity of the ink 42 at the first set of elements 44, and thus a normalized positive shear strain signal. When the second signal 48B:48D is divided by the third signal 48B:48C, the ratio 48B:48D/48B:48C provides a normalized value of the resistivity of the ink 42 at the second set of elements 46, and thus a normalized negative shear strain signal.

By obtaining a normalized value of the resistivity of the ink 42, each shear sensor 34 and 36 is capable of real-time calibration, which reduces potential changes in the resistivity of the ink due to manufacturing, thereby reducing manufacturing dispersion. In addition, such real-time calibration of each shear sensor 34 and 36 reduces potential changes in the resistivity of the ink 42 due to aging, thereby reducing aging effect. In addition, the delays between the normalized positive shear strain signal pulse 48A:48B/48B:48C and the normalized negative shear strain pulse 48B:48D/48B:48C are proportional to tire loading and can be used to determine the vertical loading on the tire 10 and the wear state of the tire.

Each shear sensor 34 and 36 may deliver a fourth signal. The fourth signal, 48A:48D, is referred to as a total shear signal for each shear sensor 34 and 36. When the fourth signal 48A:48D is divided by the third signal 48B:48C, the ratio 48A:48D/48B:48C provides a normalized value of the resistivity of the ink 42, which in turn yields a normalized total shear for each shear sensor 34 and 36. The normalized total shear for each shear sensor 34 and 36 is proportional to tire loading and can be used to determine the vertical loading on the tire 10 and the wear state of the tire.

Figure 3A:
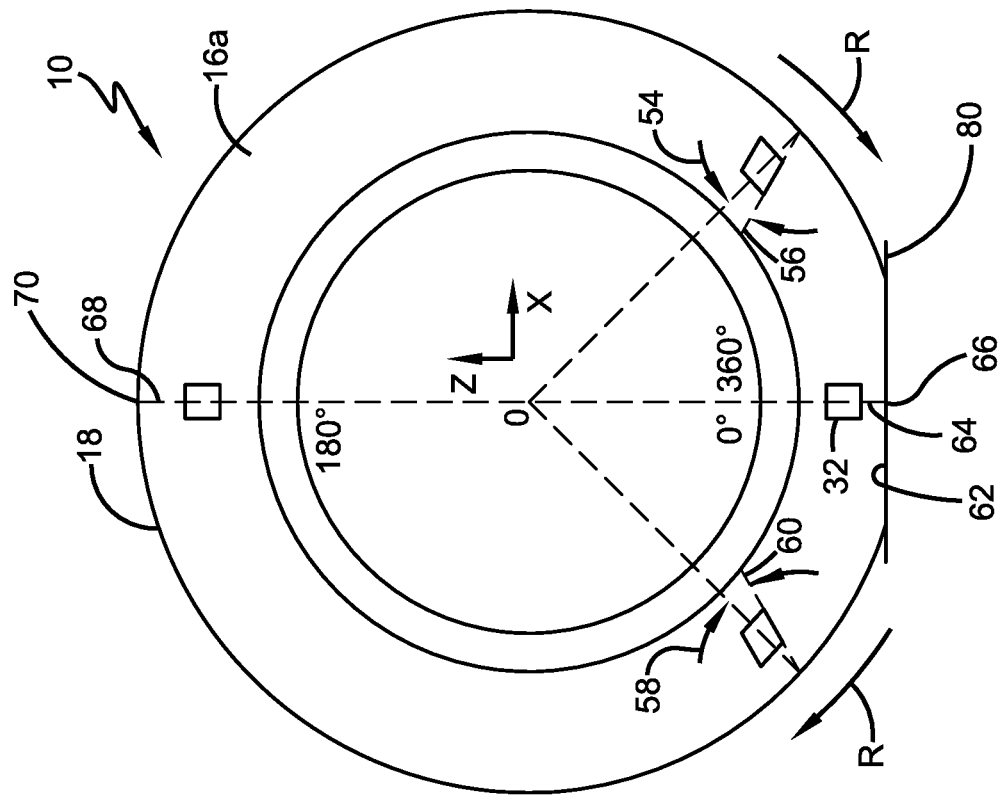
FIG. 3a is a schematic representation of an outboard side of the tire shown in FIG. 2.

With reference now to FIGS. 3*a* and 3*b*, the shear sensors 34 and 36 measure tire physical properties in the sidewall zone 32 (FIG. 1) of each respective sidewall 16*a* and 16*b*. During each rotation of the tire 10, the sidewall zone 32 of each respective sidewall 16*a* and 16*b* deflects progressively as the crown zone 30 approaches the rolling surface 80. Such deformation produces an effect referred to as de-radialization of the tire carcass 20, which appears because the plies of the carcass, before and after the crown zone 30 is in contact with the rolling surface 80, do not remain in their radial configuration.

More particularly, the contact area between the tread 18 and the rolling surface 80 is known in the art as a footprint 62 of the tire 10. Before or prior to the footprint 62, the plies of the carcass 20 form an angle 54 with a geometric ray 56 of the unloaded portion of the tire 10. The angle 54 is referred to as the maximum leading edge de-radialization angle. After the tire footprint 62, the plies of the carcass 20 form an angle 58 with a geometric ray 60 of the unloaded portion of the tire 10. The angle 58 is referred to as the maximum trailing edge de-radialization angle.

When the tire 10 is in a dynamic rolling condition, a monitored cross section plane 64 near a center 66 of the footprint 62 has a de-radialization angle of zero. Likewise, a monitored cross section plane 68 at a top 70 of the crown zone 30, which is 180 degrees from the footprint center 66, also has a de-radialization angle of zero. As the tire 10 rotates, indicated by arrow R, the de-radialization angle increases from zero near the footprint center 66 to a maximum at the trailing edge de-radialization angle 58, and then decreases to zero at the crown zone top 70. After the crown zone top 70, the de-radialization angle again increases from zero to a maximum at the leading edge de-radialization angle 54, and then decreases to zero near the footprint center 66. It is to be understood that the de-radialization angle is zero near the footprint center 66 due to rolling resistance of the tire 10; for an ideal tire with no rolling resistance, the de-radialization angle is zero at the footprint center.

Due to de-radialization of the tire carcass 20, deformation or shearing of the sidewall zone 32 of each respective sidewall 16*a* and 16*b* occurs. The inboard shear sensor 34 (FIG. 2) measures deformation in the sidewall zone 32 (FIG. 1) of the inboard sidewall 16*a* and transmits a first shear deformation signal indicated at 72 and shown in FIG. 4*a*. The rotational position of the inboard shear sensor 34 is displayed on the horizontal axis 76 and the shear strain amplitude is displayed on the vertical axis 78. The outboard shear sensor 36 measures deformation in the sidewall zone 32 of the outboard sidewall 16*b* and transmits a second shear deformation signal indicated at 74 and shown in FIG. 4*b*. The rotational position of the outboard shear sensor 36 is displayed on the horizontal axis 76 and the shear strain amplitude is displayed on the vertical axis 78.

Figure 4B:
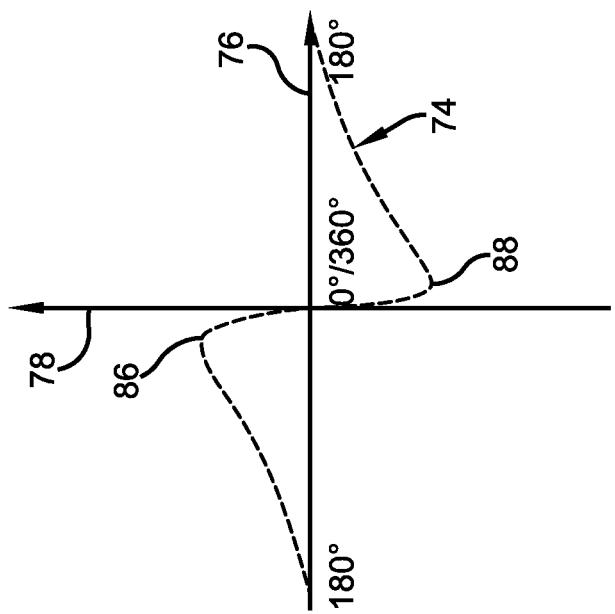
Figure 4A:
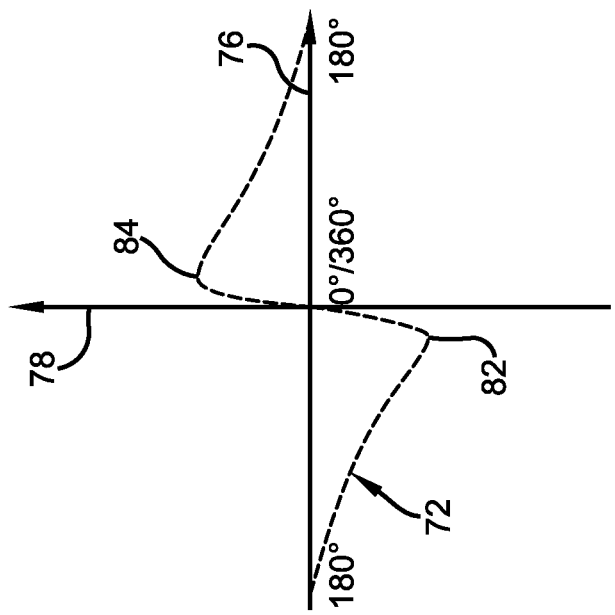

During one revolution of the tire 10, the shear sensors 34 and 36 record four maximum shear strain amplitudes. As shown in FIG. 4*a*, the inboard shear sensor 34 records a first maximum amplitude 82 that corresponds to the leading edge de-radialization angle 54 (FIG. 3*a*) and a second maximum amplitude 84 that corresponds to the trailing edge de-radialization angle 58. As shown in FIG. 4*b*, the outboard shear sensor 36 records a third maximum amplitude 86 that corresponds to the leading edge de-radialization angle 54 (FIG. 3*a*) and a fourth maximum amplitude 84 that corresponds to the trailing edge de-radialization angle 58.

The inboard shear sensor 34 electronically communicates the first shear deformation signal 72, including the first maximum amplitude 82 and the second maximum amplitude 84, to the TPMS unit 40. The outboard shear sensor 36 electronically communicates the second shear deformation signal 74, including the third maximum amplitude 86 and the fourth maximum amplitude 88, to the TPMS unit 40. The TPMS unit 40 includes tire pressure data as known to those skilled in the art, and employs the four maximum shear strain amplitudes 82, 84, 86 and 88 to calculate the instant vertical, lateral and longitudinal loads on the tire 10.

In addition, by incorporating historical data, the TPMS unit 40 can calculate the wear state of the tire 10, as the first and second shear deformation signals 72 and 74 change over time due to tire wear. Because the TPMS unit 40 is in communication with other vehicle systems through the vehicle CAN bus, the vertical, lateral and longitudinal loads, as well as the tire wear state, can be communicated to these systems, and also displayed for the driver of the vehicle.

Turning now to FIGS. 5*a* through 5*d*, de-radialization of the tire carcass 20 is characterized by four aspects. The first aspect is a de-radialization direction 90 towards the trailing edge de-radialization angle 58. The second aspect is a de-radialization direction 92 towards the leading edge de-radialization angle 54. The third aspect is the maximum value of the trailing edge de-radialization angle 58. The fourth aspect is the maximum value of the leading edge de-radialization angle 54. These aspects are all proportional with the vertical loading of the tire 10, which is indicated by arrows L1 and L2.

Figure 5A:
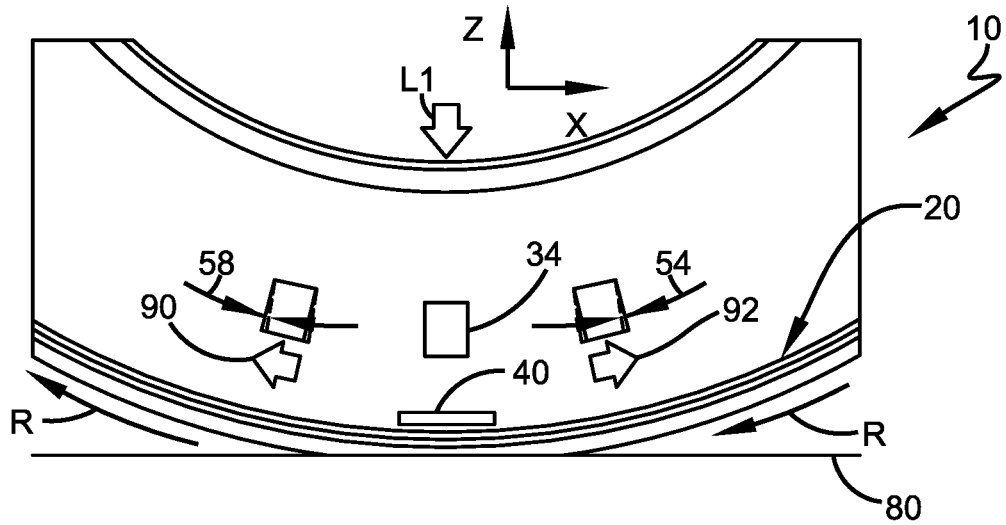
FIG. 5a is a schematic sectional representation of a portion of the tire shown in FIG. 2 in a first loading condition.
Figure 5B:
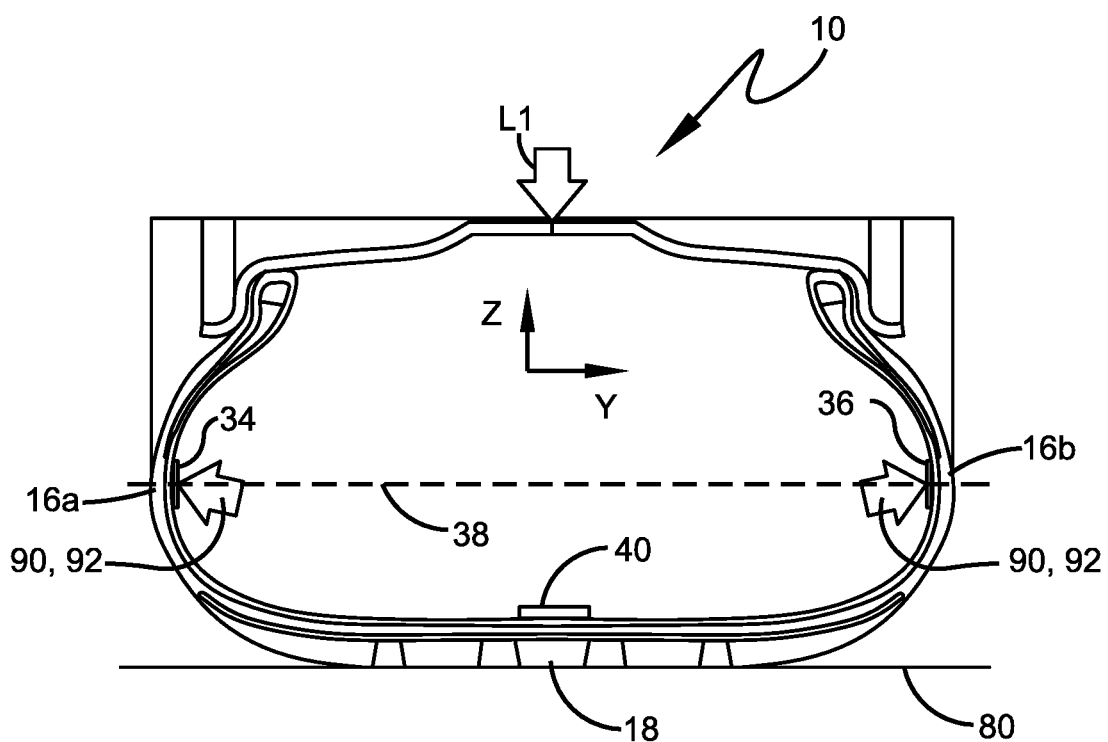
Figure 5C:
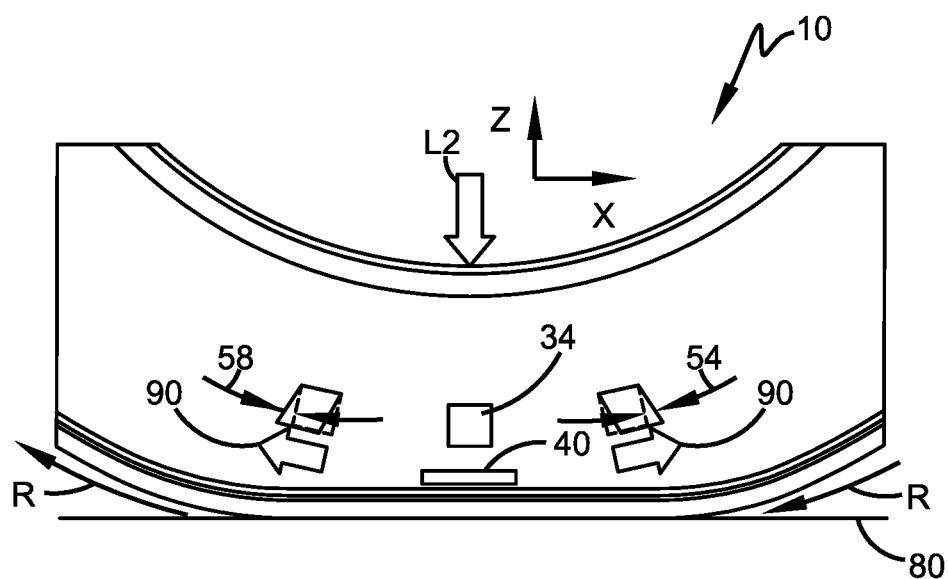
FIG. 5c is a schematic sectional representation of a portion of the tire shown in FIG. 5a in a second loading condition.
Figure 5D:
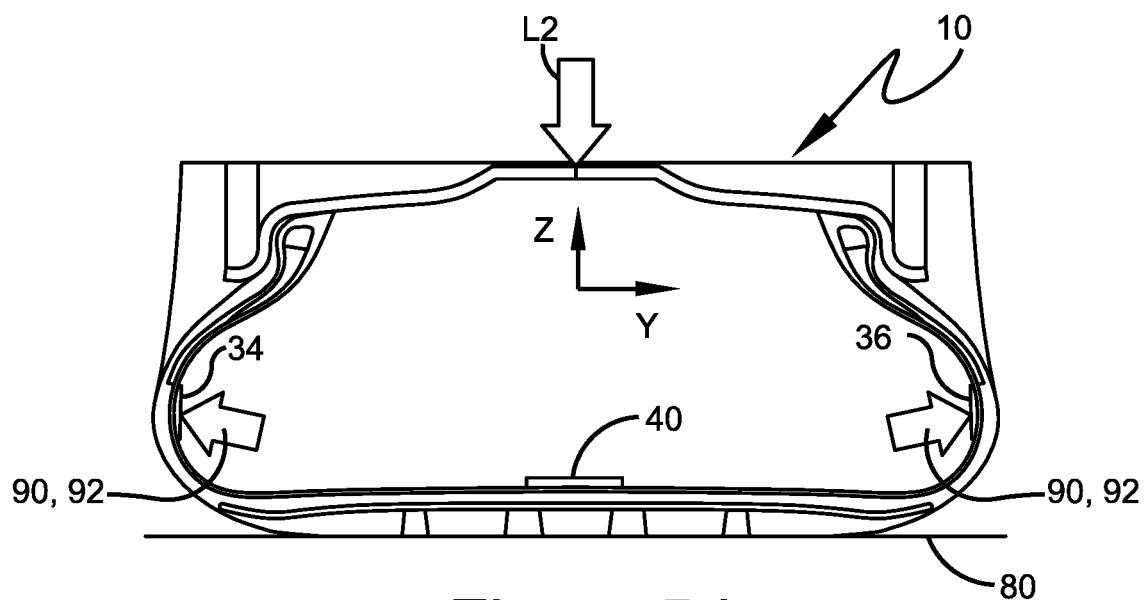
FIG. 5d is a schematic cross-sectional view of the tire shown in FIG. 5c.

The greater the vertical load, the greater the load in the trailing edge de-radialization direction 90 and the leading edge de-radialization direction 92, and the greater the maximum value of the trailing edge de-radialization angle 58 and the leading edge de-radialization angle 54. More particularly, an initial vertical load L1 on the tire 10 is shown in FIGS. 5a and 5b, which yields initial load values in the trailing edge de-radialization direction 90 and the leading edge de-radialization direction 92, and initial values of the trailing edge de-radialization angle 58 and the leading edge de-radialization angle 54. As the vertical load on the tire 10 increases, as indicated by L2 in FIGS. 5c and 5d, the load values in the trailing edge de-radialization direction 90 and the leading edge de-radialization direction 92 increase, and the values of the trailing edge de-radialization angle 58 and the leading edge de-radialization angle 54 increase.

Figure 7B:
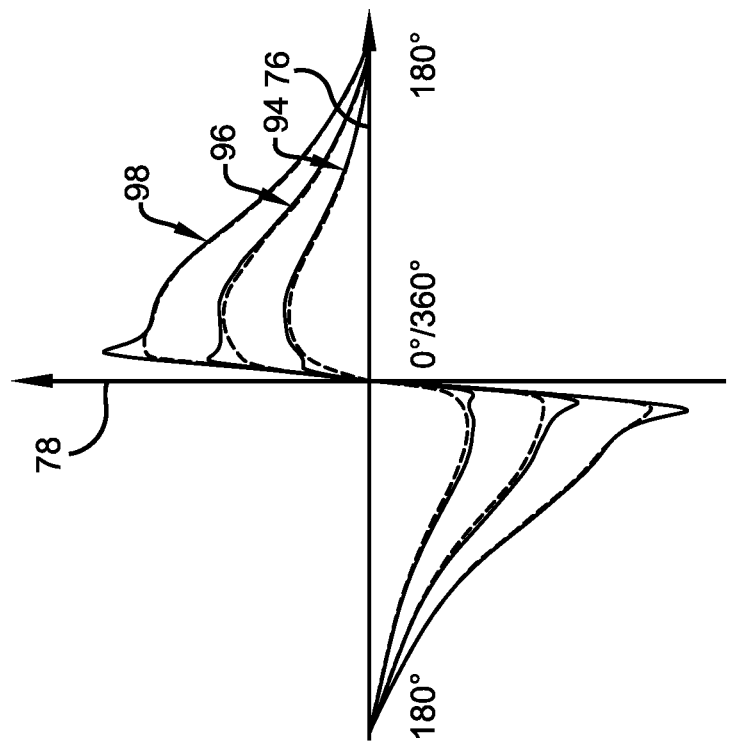
FIG. 7b is a graphical representation of another set of signals of the shear sensors shown in FIG. 2.
Figure 7A:
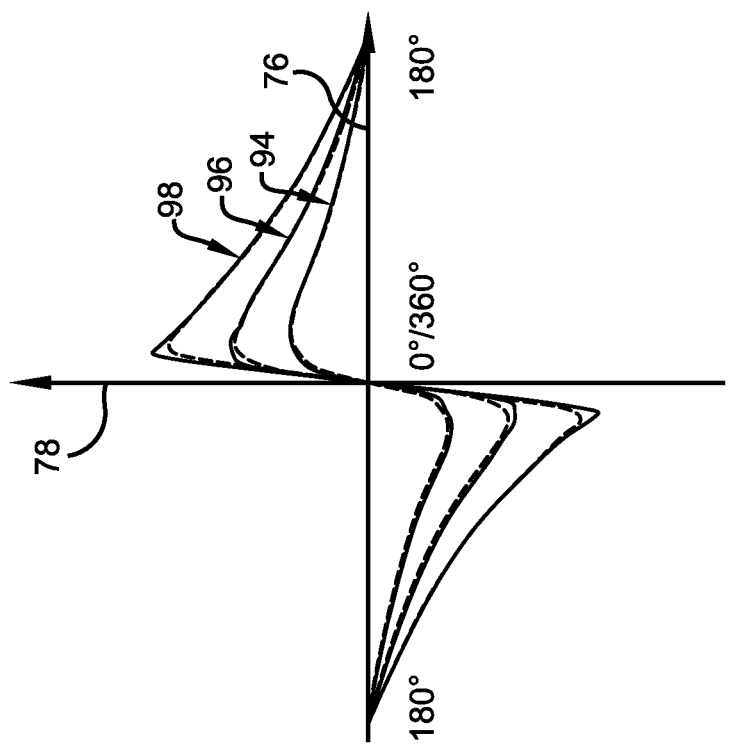
FIG. 7a is a graphical representation of a set of signals of the shear sensors shown in FIG. 2.

Referring now to FIGS. 7a and 7b, vertical loading on the tire 10 may be determined based upon the above-described data from the inboard shear sensor 34 and the outboard shear sensor 36. Testing was conducted for a first tire size and construction with results shown in FIG. 7a, and for a second tire size and construction with results shown in FIG. 7b. The rotational position of an exemplary shear sensor 34 or 36 is displayed on each respective horizontal axis 76 and the shear strain amplitude is displayed on each respective vertical axis 78. Three different shear deformation signals are indicated by the solid lines in each graph. The first signal, indicated by 94, corresponds to a first vertical load. The second signal, indicated by 96, corresponds to a second vertical load that is greater than the first vertical load, and indicates greater amplitudes than the first signal 94. The third signal, indicated by 98, corresponds to a third vertical load that is greater than the first and second vertical loads, an indicates greater amplitudes than the first signal 94 and the second signal 96.

From the signals 94, 96 and 98, it can be seen that the amplitude of the shear strain indicated by the shear sensor 34 or 36 is directly proportional to the vertical load of the tire 10. The signal 94, 96 and 98 depends on the size and construction type of each tire 10, as shown by the differences in the curves between FIGS. 7a and 7b. From the signals 94, 96 and 98, a polynomial relationship between vertical loading and shear strain amplitudes may be determined for each tire type. Therefore, an algorithm stored in the processor of the TPMS unit 40 may include the determination of the appropriate polynomial relationship between vertical loading and shear strain amplitudes to enable calculation of the vertical load acting on the tire 10. In addition, the dashed lines for each signal 94, 96 and 98 correspond to deformation signals for the same respective tire at the same loads as the solid lines, but after tire wear. Using the difference between the solid line and the dashed line for each respective signal 94, 96 and 98, the wear experienced by the tire 10 may be determined.

Turning now to FIGS. 8a and 8b, lateral vertical loading on the tire 10 may be determined based upon the above-described data from the inboard shear sensor 34 and the outboard shear sensor 36. When the tire 10 is in a cornering condition, the portion of each respective sidewall 16 adjacent the footprint 62 (FIG. 3a) deforms in a different manner. For example, when the tire 10 corners toward its inboard side, the sidewall zone 32 of the inboard sidewall 16a adjacent the footprint 62 experiences greater deformation than the sidewall zone of the outboard sidewall 16b adjacent the footprint. In such a case, the inboard shear sensor 34 will indicate greater deformation than the outboard shear sensor 36.

FIG. 8a shows three shear strain signals from the outboard shear sensor 36, and FIG. 8b shows three corresponding shear strain signals from the inboard shear sensor 34. A first shear strain signal 100 (FIG. 8a) and 100' (FIG. 8b) corresponds to a dynamic rolling condition and cornering toward the outboard side of the tire 10. A second shear strain signal 102 (FIG. 8a) and 102' (FIG. 8b) corresponds to a dynamic rolling condition with no cornering shear strain signal. A third shear strain signal 104 (FIG. 8a) and 104' (FIG. 8b) corresponds to a dynamic rolling condition and cornering towards the inboard side of the tire 10. The signals 100, 100', 102, 102', 104 and 104' are taken as reference signals for the computation of the dynamic lateral loading with the help of an algorithm processed by the TPMS unit 40.

The algorithm preferably also inputs amplitudes of the respective signals 100, 100', 102, 102', 104 and 104', including: a first signal peak amplitude 106 from the outboard shear sensor 36 near a trailing edge under cornering towards the outboard side of the tire 10; a second signal peak amplitude 108 from the inboard shear sensor 34 near a trailing edge under cornering towards the outboard side of the tire; a third signal peak amplitude 110 from the outboard shear sensor near a trailing edge under no cornering; a fourth signal peak amplitude 112 from the inboard shear sensor near a trailing edge under no cornering; a fifth signal peak amplitude 114 from the outboard shear sensor near a trailing edge under cornering towards the inboard side of the tire; and a sixth signal peak amplitude 116 from the inboard shear sensor near a trailing edge under cornering towards the inboard side of the tire.

The difference between each corresponding set of shear strain signals from the outboard shear sensor 36 and the inboard shear sensor 34, for example, signal 100 and signal 100', correlates to the difference between the deformation between each respective outboard sidewall 16b and inboard sidewall 16a. This difference is directly proportional to the lateral loading acting on the tire 10. In addition, the sum of each corresponding set of shear strain signals from the outboard shear sensor 36 and the inboard shear sensor 34 is directly related to the dynamic vertical loading acting on the tire 10.

Figure 9B:
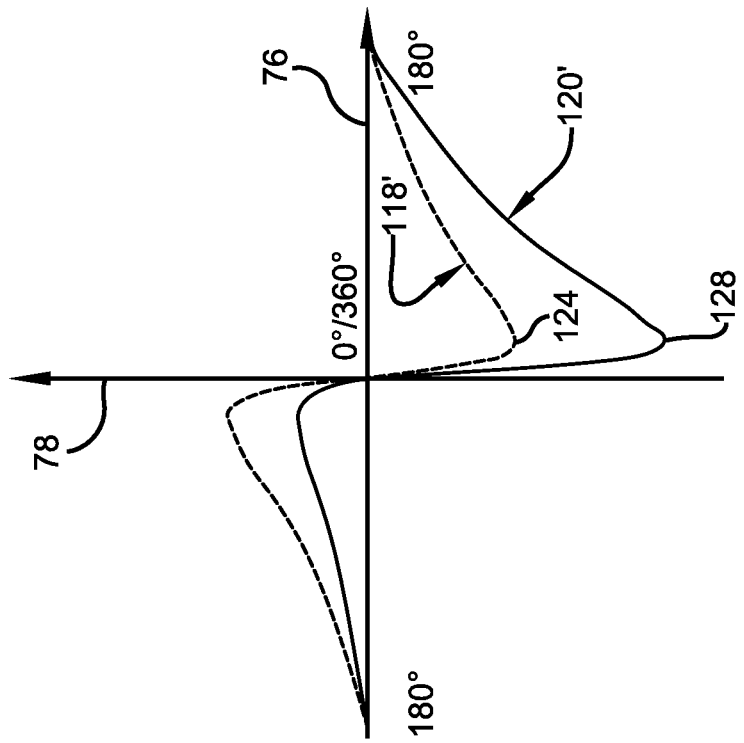
FIG. 9b is a graphical representation of yet another set of signals of the shear sensors shown in FIG. 2.
Figure 9A:
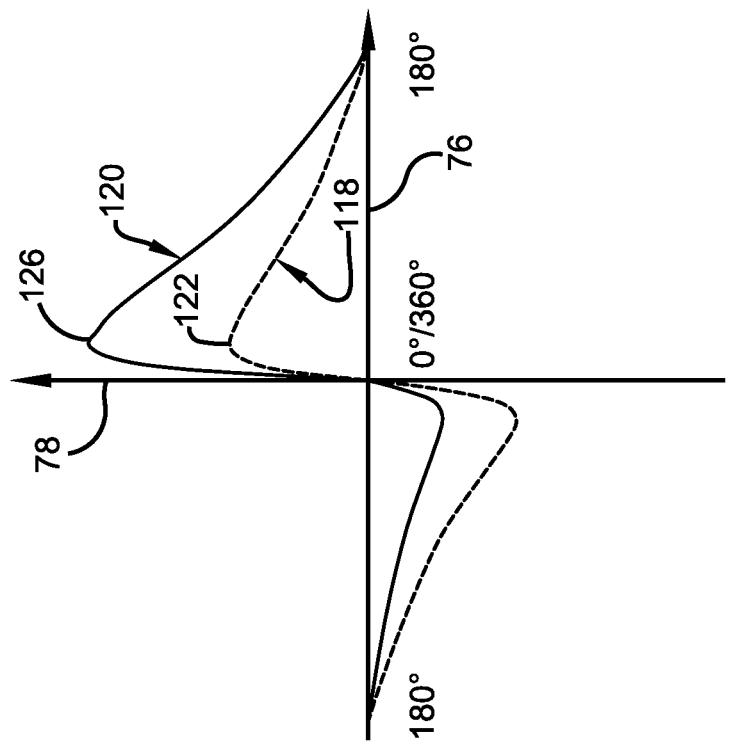
FIG. 9a is a graphical representation of still another set of signals of the shear sensors shown in FIG. 2.

With reference to FIGS. 9a and 9b, longitudinal loading, such as loading from braking and acceleration, on the tire 10 may be determined based upon the above-described data from the inboard shear sensor 34 and the outboard shear sensor 36. When the tire 10 is in a braking condition without cornering, the portion of each respective sidewall 16 adjacent the footprint 62 (FIG. 3a) deforms more toward the trailing direction 90 (FIG. 5a) and carcass de-radialization is greater towards the trailing edge direction. When the tire 10 is in an accelerating condition without cornering, the portion of each respective sidewall 16 adjacent the footprint 62 deforms more toward the leading direction 92 and carcass de-radialization is greater towards the leading edge direction. As a result, the shear sensor signal in a braking condition will be similar to the shear sensor signal in an accelerating condition, with opposing amplitudes.

For example, to determine longitudinal loading from braking, a first shear signal 118 from the outboard shear sensor 36, and a first shear signal 118' from the inboard shear sensor 34, correspond to a dynamic rolling condition of the tire 10 with no braking or acceleration. A second shear signal 120 from the outboard shear sensor 36, and a second shear signal 120' from the inboard shear sensor 34, correspond to a dynamic rolling condition and braking with no cornering. The signals 118, 118', 120 and 120' are taken as reference signals for the computation of the dynamic longitudinal loading with the help of an algorithm processed by the TPMS unit 40.

The algorithm preferably also inputs amplitudes of the respective signals 118, 118', 120 and 120', including by way of example: a first signal peak amplitude 122 from the outboard shear sensor 36 near the trailing edge under steady state rolling; a second signal peak amplitude 124 from the inboard shear sensor 34 near the trailing edge under steady state rolling; a third signal peak amplitude 126 from the outboard shear sensor near the trailing edge under a braking condition; and a fourth signal peak amplitude 128 from the inboard shear sensor near the trailing edge under a braking condition.

Figure 10A:
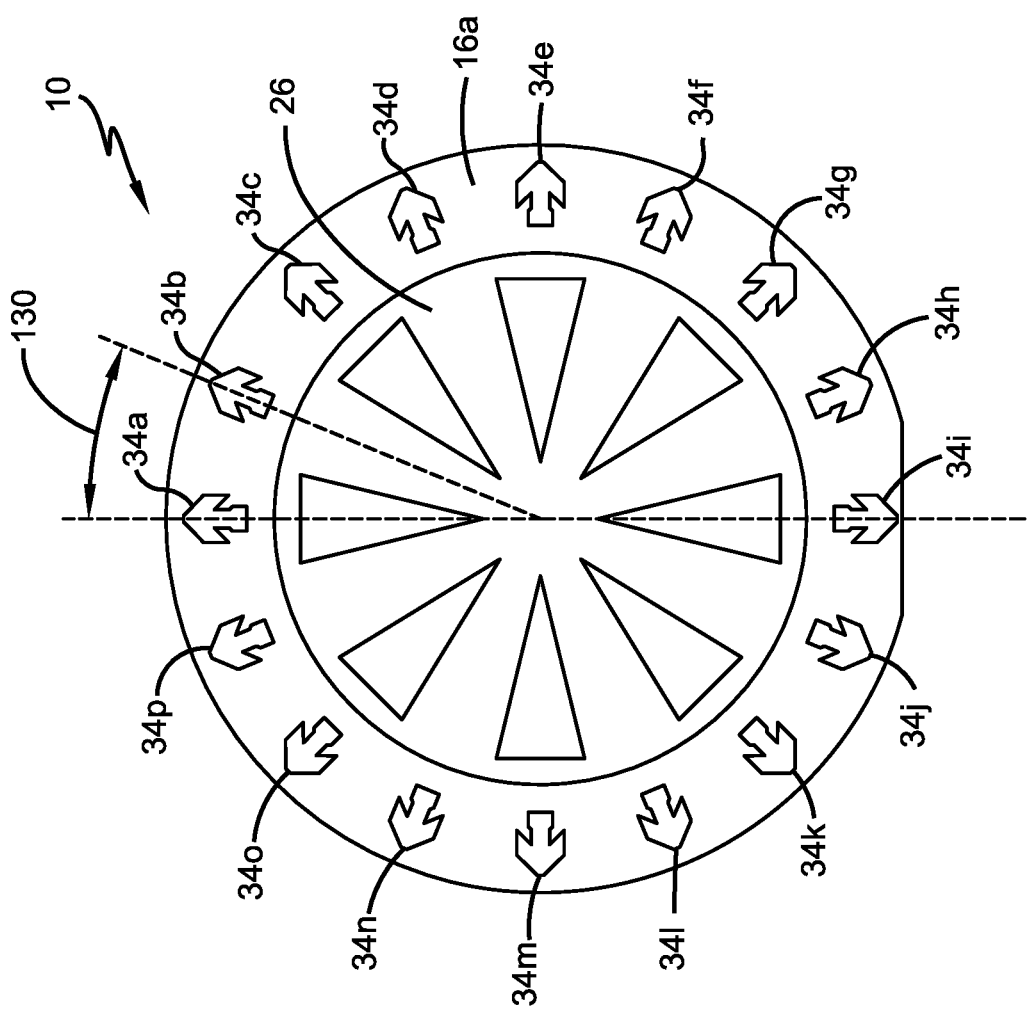
FIG. 10a is a schematic representation of an outboard side of another exemplary embodiment of a tire with printed shear sensors of the present invention, shown mounted on a wheel.
Figure 10B:
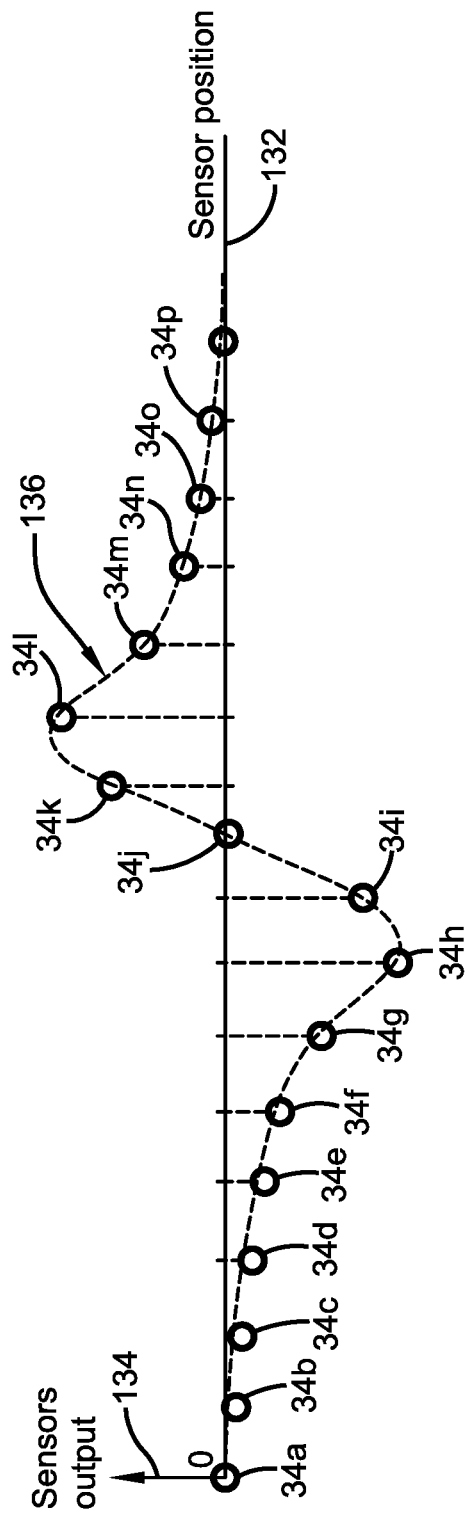

Turning to FIGS. 10*a* and 10*b*, vertical loading on tire 10 when it is not rotating may be determined based upon the above-described data from the inboard shear sensor 34 or the outboard shear sensor 36. For a non-rotating tire 10, only the inboard sidewall 16*a* or the outboard sidewall 16*b* includes the shear sensor 34 or 36, since in parked conditions, sidewall shear typically is similar in both sidewalls. Reference herein shall be made to the inboard sidewall 16*a* and the inboard shear sensor 34 by way of example, with the understanding that such reference may alternatively apply to the outboard sidewall 16*b* and the outboard shear sensor 36.

A plurality of shear sensors indicated at 34*a* through 34*p* preferably is printed on the tire innerliner 22 (FIG. 1) in the sidewall zone 32 of the inboard sidewall 16*a* about the circumference of the tire 10. The shear sensors 34*a* through 34*p* preferably are evenly spaced apart, with an angular step or distance 130 between them. The shear sensors 34*a* through 34*p* each transmit a signal indicating shear deformation, which is indicated in a graphical layout in FIG. 10*b*. The horizontal axis 132 indicates the position of each shear sensor 34*a* through 34*p*, and the vertical axis 134 indicates the amplitude of the signal from each respective shear sensor. A composite waveform signal 136 is generated, which enables the static load on the non-rotating tire 10 to be compiled. The signal 136 can be communicated through the TPMS unit 40 to the vehicle CAN bus and/or the vehicle driver. In this manner, the driver may be informed of the load on the tire 10 before moving the vehicle, and/or an overload condition of the tire may generate a system alarm and/or an alert to the vehicle driver.

In this manner, the tire 10 with printed shear sensors 34 and 36 of the present invention, including the structural features described above, desirably improves the accuracy of measurements of tire sidewall deformation to enable load conditions on the tire and the wear state of the tire to be determined in a more precise and repeatable manner, and desirably reduces manufacturing dispersion and aging effect.

The present invention also includes a method of forming a tire 10 with printed shear sensors 34 and 36, and a method of determining tire load for a tire with printed shear sensors. Each method includes steps in accordance with the description that is presented above and shown in FIGS. 1 through 10*b*.

It is to be understood that the structure of the above-described tire 10 with printed shear sensors 34 and 36 may be altered or rearranged, or components or steps known to those skilled in the art omitted or added, without affecting the overall concept or operation of the invention. For example, more than one pair of shear sensors 34 and 36 may be employed in a particular tire 10, and different configurations of ink 42 for the shear sensors may be used based upon particular design considerations.

The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire with printed shear sensors, comprising:
   a pair of bead areas;
   a ground-contacting tread disposed radially outwardly of the pair of bead areas;
   a pair of sidewalls, including an inboard sidewall extending from a first one of the bead areas to the tread, and an outboard sidewall extending from a second one of the bead areas to the tread;
   a carcass extending toroidally between each of the bead areas radially inwardly of the tread;
   an innerliner formed on an inside surface of the carcass;
   a pair of resistive shear sensors printed on the innerliner, wherein a first sensor is printed in a sidewall zone of the inboard sidewall and a second sensor is printed in a sidewall zone of the outboard sidewall;
   the first shear sensor measuring deformation in the sidewall zone of the inboard sidewall and transmits a first shear deformation signal, the first shear deformation signal including a first maximum amplitude corresponding to a leading edge de-radialization angle and a second maximum amplitude corresponding to a trailing edge de-radialization angle; and
   the second shear sensor measuring deformation in the sidewall zone of the outboard sidewall and transmits a second shear deformation signal, the second shear deformation signal including a third maximum amplitude corresponding to a leading edge de-radialization angle and a fourth maximum amplitude corresponding to a trailing edge de-radialization angle.

2. The tire with printed shear sensors of claim 1, wherein the shear sensors are disposed in the same horizontal plane extending laterally across the tire.

3. The tire with printed shear sensors of claim 1, wherein the shear sensors are in electronic communication with a tire pressure monitoring system.

4. The tire with printed shear sensors of claim 1, wherein each shear sensor is printed on the innerliner by at least one of ink-jet printing and three-dimensional printing.

5. The tire with printed shear sensors of claim 1, wherein each sensor is printed directly on the innerliner.

6. The tire with printed shear sensors of claim 1, wherein each sensor is printed on a substrate that is attached to the innerliner.

7. The tire with printed shear sensors of claim 6, wherein the substrate includes a rubber-foil compound.

8. The tire with printed shear sensors of claim 1, wherein each shear sensor includes a conductive ink with a known electrical resistance.

9. The tire with printed shear sensors of claim 8, wherein the conductive ink is deposited in a strip arranged to form:
   a first set of parallel elements oriented at a first angle relative to a radial axis of the tire;
   a second set of parallel elements oriented at a second angle relative to the radial axis of the tire, wherein the second angle opposes the first angle;
   a first terminal connected to the first set of parallel elements;
   a fourth terminal connected to the second set of parallel elements;
   a second terminal disposed parallel to the radial axis of the tire between the first set of parallel elements and the second set of parallel elements; and
   a third terminal disposed parallel to the radial axis of the tire between the second terminal and the fourth terminal.

10. The tire with printed shear sensors of claim 9, wherein the first angle is about 45 degrees relative to the radial axis of the tire and the second angle is about −45 degrees relative to the radial axis of the tire.

11. The tire with printed shear sensors of claim 9, wherein each shear sensor provides a normalized positive shear strain signal from the first set of parallel elements and a normalized negative shear strain signal from the second set of parallel elements.

12. The tire with printed shear sensors of claim 9, wherein each shear sensor provides a normalized total shear for the respective shear sensor.

13. A tire with printed shear sensors, comprising:
a pair of bead areas;
a ground-contacting tread disposed radially outwardly of the pair of bead areas;
a pair of sidewalls, including an inboard sidewall extending from a first one of the bead areas to the tread, and an outboard sidewall extending from a second one of the bead areas to the tread;
a carcass extending toroidally between each of the bead areas radially inwardly of the tread;
an innerliner formed on an inside surface of the carcass; and
a pair of resistive shear sensors printed on the innerliner, wherein a first sensor is printed in a sidewall zone of the inboard sidewall and a second sensor is printed in a sidewall zone of the outboard sidewall, each respective shear sensor providing:
a first shear deformation signal for a first vertical load, wherein the first signal includes a first amplitude; and
a second shear deformation signal for a second vertical load, wherein the second vertical load is separate from the first vertical load and includes a second amplitude, and wherein the first and second shear deformation signals enable the determination of a polynomial relationship between the signal amplitudes and vertical loading on the tire.

14. The tire with printed shear sensors of claim 13, wherein each respective shear sensor provides a third shear deformation signal that includes a third amplitude and which corresponds to the first vertical load, wherein a difference between the first amplitude and the third amplitude indicates wear of the tire.

15. A tire with printed shear sensors, comprising:
a pair of bead areas;
a ground-contacting tread disposed radially outwardly of the pair of bead areas;
a pair of sidewalls, including an inboard sidewall extending from a first one of the bead areas to the tread, and an outboard sidewall extending from a second one of the bead areas to the tread;
a carcass extending toroidally between each of the bead areas radially inwardly of the tread;
an innerliner formed on an inside surface of the carcass; and
a pair of resistive shear sensors printed on the innerliner, wherein a first sensor is printed in a sidewall zone of the inboard sidewall and a second sensor is printed in a sidewall zone of the outboard sidewall, each respective shear sensor providing:
a first shear strain signal that corresponds to a dynamic rolling condition and cornering toward an outboard side of the tire;
a second shear strain signal that corresponds to a dynamic rolling condition that does not include a cornering shear strain signal; and
a third shear strain signal that corresponds to a dynamic rolling condition and cornering towards an inboard side of the tire, wherein the first, second and third shear strain signals are reference signals for a determination of dynamic lateral loading of the tire.

16. The tire with printed shear sensors of claim 15, wherein a difference between the first shear strain signal from the inboard shear sensor and the first shear strain signal from the outboard shear sensor correlates to a difference between deformation of the inboard sidewall and the outboard sidewall.

17. The tire with printed shear sensors of claim 15, wherein a sum of the first shear strain signal from the inboard shear sensor and the first shear strain signal from the outboard shear sensor correlates to a dynamic vertical load acting on the tire.

18. A tire with printed shear sensors, comprising:
a pair of bead areas;
a ground-contacting tread disposed radially outwardly of the pair of bead areas;
a pair of sidewalls, including an inboard sidewall extending from a first one of the bead areas to the tread, and an outboard sidewall extending from a second one of the bead areas to the tread;
a carcass extending toroidally between each of the bead areas radially inwardly of the tread;
an innerliner formed on an inside surface of the carcass; and
a pair of resistive shear sensors printed on the innerliner, wherein a first sensor is printed in a sidewall zone of the inboard sidewall and a second sensor is printed in a sidewall zone of the outboard sidewall, each respective shear sensor providing:
a first shear strain signal that corresponds to a dynamic rolling condition of the tire without at least one of braking and acceleration; and
a second shear strain signal that corresponds to a dynamic rolling condition of the tire and at least one of braking and acceleration and which does not include cornering, wherein the first and second shear strain signals are reference signals for a determination of dynamic longitudinal loading of the tire.

\* \* \* \* \*